Patented Feb. 11, 1936

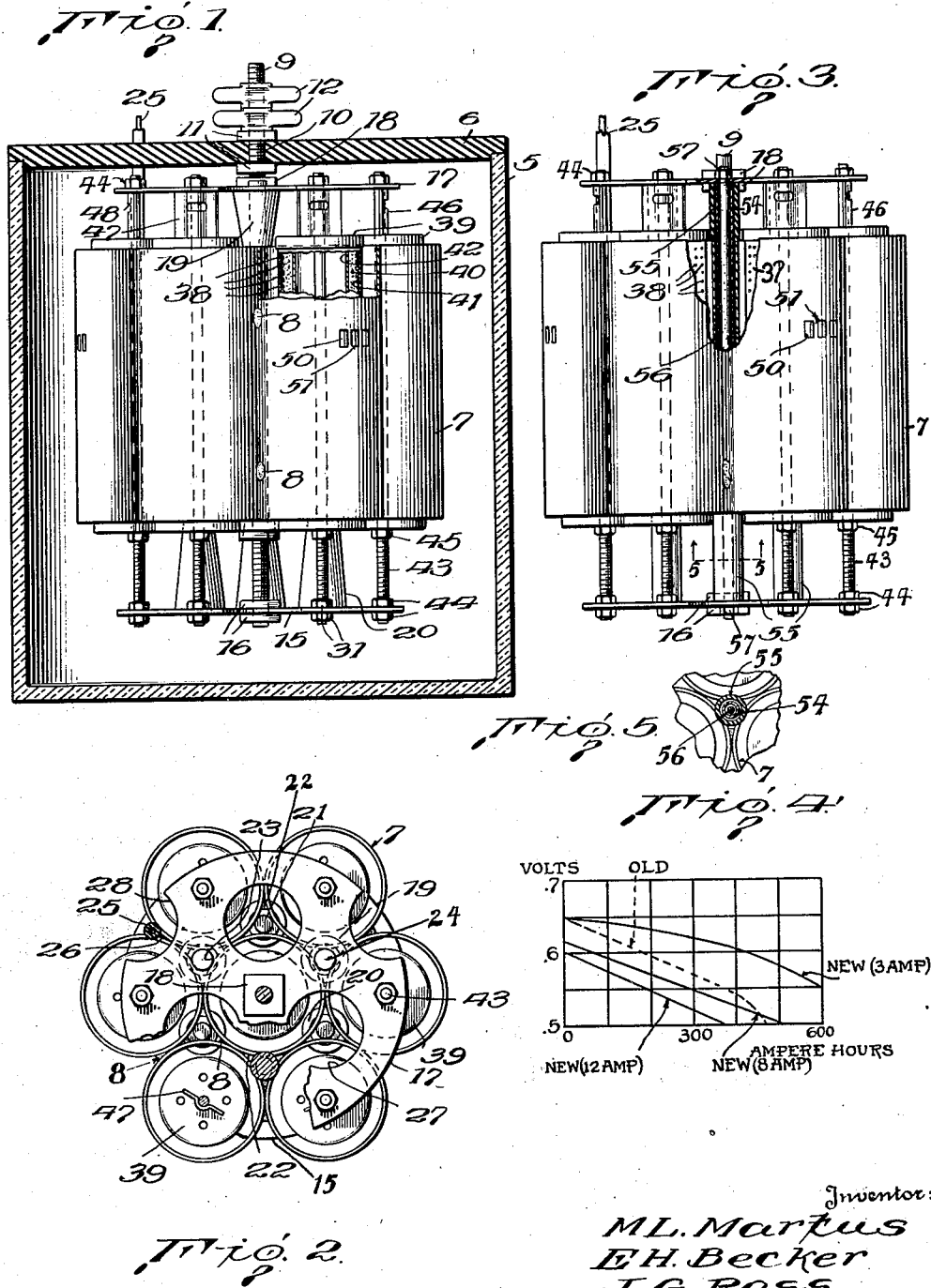

2,030,177

UNITED STATES PATENT OFFICE 2,030,177

PRIMARY CELL

Martin L. Martus, Woodbury, and Edmund H. Becker and James G. Ross, Waterbury, Conn.

Application February 26, 1935, Serial No. 8,396

15 Claims. (Cl. 136—115)

This invention relates to primary cells; and it comprises a low internal resistance primary cell employing an alkaline electrolyte and having a high capacity for its size, great structural strength and constant discharge characteristics, even at high rates of discharge, said cell comprising an anode combination having a plurality of cylindrical zinc anode members, and a like plurality of rod-like cathodes disposed within the zinc anode members, suspension means extending the height of the electrodes, supporting spiders for the electrodes attached to the suspension means, means attaching the cathodes to the spiders and means for supporting the anode combination from the spiders and insulating it therefrom, and electrical connections for the anodes and cathodes; all as more fully hereinafter set forth and as claimed.

Primary cells of the modern modified Lalande type find considerable use in signal, telegraph and telephone work. These uses require a dependable source of power that will give a small current with substantially constant potential over a long period of time. The uses described often require a closed circuit. Cells of this type are well suited for closed circuit work; in fact they are most efficient when always connected in a high resistance circuit, passing a slight current.

The modern Lalande type wet cell comprises, broadly, a zinc electrode (anode), a depolarizer cathode, a cell jar and cover in which these electrodes are suspended, and a body of aqueous electrolyte in the jar. The electrolyte is commonly a concentrated caustic soda solution, although it may comprise caustic potash.

Many different types and arrangements of electrodes have been proposed. The shape, spacing and character of the surface of the electrodes affects the characteristics of the cell; the discharge rate, the voltage drop during discharge, and the constancy of output. Many of the proposed structures have not met with success, because they were needlessly complicated and hard to make; because they failed in their objects; or more often, because they did not represent a thorough understanding of the underlying principles of this type of cell.

For a long time, the principal use of primary batteries has been in circuits in which the discharge rate of the battery is low and fairly uniform; for example, conventional telegraph and signal circuits. Primary batteries are ideal for such purposes. A signal tower, for example, provided with a primary battery current supply, is a self-contained power plant; it is independent of outside sources of current, or of the necessity of using storage batteries, which require frequent recharging. The signal service is thus dependable and cannot be disrupted by weather conditions, such as sleet storms, which affect line wires. However, recent development of certain enlarged and complex signaling devices and systems have made necessary the provision of a heavier supply of current; a source which will stand heavy drains for short periods. This is the case in certain modern signaling systems, such as those at railroad crossings, requiring two, four or more signals. It has been necessary to operate such systems by storage batteries or by alternating current, because ordinary primary batteries cannot stand the high amperage drain required. Thus an element of unreliability is introduced.

According to the present invention there is provided a cell of modified Lalande type having outstandingly improved characteristics. The internal resistance of the cell is reduced. The capacity and discharge rate for a cell of given bulk is higher than in conventional cells of the same size and at the same time the output is more nearly constant. There is less falling off during discharge, even at rates of discharge higher than those ordinarily encountered. The cell is exceptionally strong and durable, the construction being designed for maximum structural strength. It withstands abuse in shipping and shocks and jars in service.

The present cells are of particular utility in individual power plants in signal systems and the like, even where the current required is high. The present cell is capable of delivering current at 12 amperes and can deliver at even higher amperage rates for sufficient periods to operate multiple signals. The present cell can be used in installations which hitherto have required storage batteries or line current. Moreover, the present cell is readily adaptable for standard signal installations. The working parts of the cell can be used in standard size jars; these jars being permanent parts of signal installations. The cell is the most compact we know of; giving the largest effective surface area which can economically be provided in standard capacity jars.

Briefly, the cell comprises an electrode assembly suspended in a cell jar, the assembly having a plurality of cylindrical zinc anodes grouped in close packed formation, joined together electrically in parallel and suspended from the cover by a rigid spider and supporting rod structure. Concentrically positioned inside each anode is a cathode, comprising a perforated metal cylinder containing the depolarizing material: granular copper oxid, or, sometimes, activated carbon. These cathodes are firmly mounted on the same supporting means that carries the anodes, but are insulated therefrom.

While the cell is primarily adapted for use with copper oxid as the depolarizer, it can also be employed with activated carbon, retaining many of the advantages described and securing certain new advantages. Hitherto, air depolarized cells, using activated carbon, have not been considered adapted for high rates of discharge. Diffusion of air into the depolarizer material is a relatively slow process. But the present cell makes possible utilizing activated carbon in such a way that a much higher amperage can be drawn than in the case of conventional types of air depolarized cell. This is in part due to the large active electrode area provided. That is, whether the present cell be employed with copper oxid or activated carbon the amperage drain can be relatively higher than in conventional cells of these two types.

In modifying the cell for use with activated carbon, the cathode cylinders are extended above the level of the solution.

In the accompanying drawing, there are shown more or less diagrammatically, two examples of specific embodiments of cells within the purview of the invention. In the showings, Fig. 1 is a view partly in vertical section and partly in elevation of a complete cell embodying the invention;

Fig. 2 is a plan view looking down on the electrode assembly of the cell of Fig. 1;

Fig. 3 is a view in elevation with some parts in vertical section of a modification of the structure of Fig. 1, having a modified type of supporting means;

Fig. 4 is a chart showing the discharge characteristics of the new cell as contrasted with those of a conventional old type cell of the same dimensions and having a rated capacity of 500 ampere hours; and Fig. 5 is a fragmental sectional view along line 5—5 of Fig. 3.

In the showings, in which like reference characters indicate like parts, Fig. 1 shows a cell complete except for the electrolyte, having a cell jar 5, usually of glass, with an insulating cover 6. A negative electrode assembly is provided comprising a plurality of hollow, cylindrical zinc electrode members 7, shown as seven in number, grouped in close packing and joined together electrically in parallel as at 8 by soldering, arc-welding or the like, into a unitary cellular structure of great mechanical strength and of high electrical conductivity. The assembly is carried on a support comprising a central vertical rod 9 passing through a hole 10 in cover 6 and retained to the cover by nuts 11, as shown. The portion of the rod extending above the cover is provided with thumb screws 12 by means of which electrical connection is made. The rod extends down below the zincs and at the lower end carries a spider 15, the spider being retained by nuts 16, as shown. The rod is provided with an exactly similar upper spider or hanger 17, retained on the rod by nuts 18 (Fig. 3). The zinc electrode assembly is retained to the upper spider by means of three short insulating posts 19, advantageously of porcelain or hard rubber and of inverted frustoconical form as shown; and to the lower spider by means of three similar posts 20. Posts 19 and 20 are provided at their smaller ends with extensions 21, which extend into the space 22 between adjoining zinc cylinders (Fig 2), and at their larger ends with extensions 24, engaging perforations 23 provided in the spiders. One set of perforations 23 is shown, in the upper spider (Fig. 2); those in the lower spider are exactly similar. The zinc cell block rests on the lower posts 20 which are in turn supported on the lower spider. The upper insulating posts support the zincs at the top similarly to the arrangement at the bottom. The three upper supports are displaced through an angle with respect to the lower supports, as shown in Fig. 2, to get even greater structural strength. Electrical connection to the zinc electrode assembly is made through an insulated wire 25, soldered to the zincs as at 26, and extending through the cover as shown. Only one wire connection to the zincs is required, since they are all in electrical contact. The spiders 15 and 17 are shown as of sheet metal of cut-out or skeleton form, having circular openings 27, and notches 28 around the rim. The spiders can take other forms, if desired; but the form shown is cheap and strong.

The cathodes comprise cylindrical metal elements 37 perforated as at 38 over their surface and provided with perforated caps 39 at each end. These containers enclose a body of depolarizing material 40, which is usually copper oxid. Electrolyte has free access to the copper oxid through perforations 38. Ordinarily, a separator of cloth is provided between the copper oxid and the cylinder as indicated at 41. While the entire interior of cylinders 37 can be filled with copper oxid, advantageously a cylindrical inner shell is provided as at 42, defining an annular space for the copper oxid as shown. This arrangement brings the effective surface of the copper oxid as close to the surface of the zinc electrode as possible.

The cathodes are mounted on individual threaded rods 43 extending beyond each spider and bolted to the lower spider by nuts 44. A nut 45 supports each cathode on its rod at the bottom while at the upper end a spacer 46 advantageously spot-welded to the rod and provided with laterally extending supporting fins 47, separates the cathode from the upper spider. The spacers are perforated as at 48 to prevent capillary leakage in the narrow space between the threaded rod and the spacer. With this arrangement, capillary effect cannot carry liquid above the level of the perforation. An upper nut 44 joins each rod 43 to the upper spider, as shown. Electrical connection to the cathodes is made at the main supporting rod 9 which is in electrical communication with all the cathodes, through the spiders. Thus the individual cathode units, like the anode units, are connected in parallel. Other numbers of units can be used, but the number, arrangement and spacing shown have particular advantages.

One or more of the zinc electrodes is advantageously provided with perforations 50 defining columns 51 of different width. The degree of exhaustion of the cell can be judged by noting to what extent these columns are corroded through.

In the embodiment of the cell as described, in use the cell is provided with an electrolyte solution filling the jar up to a little below the level of perforations 48. A thin covering layer of oil is floated on the surface of the electrolyte to prevent evaporation. The perforated spacers (47) prevent upward creeping of the oil. In using the construction with activated carbon as the depolarizer, the electrolyte level can be adjusted to come slightly below the top of caps 39; the electrodes sometimes being lengthened to bring their top portions adjacent spider 17. In this case spacers 46 can be omitted.

In operation, the cell is found to have surprisingly long useful life; that is, the voltage does not drop much even when the current drain is high. Ordinarily, cells of this type are not required to deliver current at rates higher than about three amperes. When the present cell is drawn on at three amperes the voltage is almost constant for the first 500 hours of life and does not fall off to impractically low levels for a good time beyond that. When drawn upon at the exceptional rate of eight amperes, the voltage discharge characteristics are still about the same as those of an ordinary cell at three amperes, and the cell can be drawn upon continuously at a rate as high as 12 amperes.

Fig. 4 is a chart showing the discharge characteristics of a conventional type cell of 500 ampere hours rated capacity and of the same size as the present cell, at a continuous discharge rate of 3 amperes, which may be regarded as a standard or typical rate; and the characteristics for the present cell at rates of 3, 8 and 12 amperes. It is noted that the voltage during discharge at 3 amperes shows little falling off out to well beyond 500 ampere hours.

Fig. 3 shows a slightly modified form of cell, employing an alternative type of supporting means for the zincs. In this case, instead of employing insulating columns 19 and 20 the assemblage is provided with three or more insulating tubes of hard rubber or the like, indicated at 54 (Figs. 3 and 5), extending the height of the assembly, passing through the inter-zinc spaces 22 and abutting both spiders, as shown. Between the ends of the zinc cylinders and the spiders are positioned short spacing tubes 55, also of insulating material such as hard rubber, slipped over tubes 54. The columns are bolted to the spiders by bolts or threaded rods 56 and nuts 57 as shown. Three insulating columns are shown in Fig. 3 but six can be used in case exceptional ruggedness is required; the spiders being appropriately formed and perforated in this case.

The present cell has a large electrode surface area exposed for action; the total active area of the anodes and cathodes being larger than that of a standard type cell of the same height and diameter containing a single cylindrical cathode and two anodes. Moreover, with the arrangement described the cathodes are closely opposed to the anodes. The internal resistance of the cell is decreased below ordinary constructions, by reason of the close separation between electrodes and the efficient electrical connections. The cathodes, for example, are electrically connected into a unit of low resistance, by the supporting rods and spiders. Most of the internal resistance is in the copper oxid bodies; but these are so arranged as to have the least practical thickness, so that their resistance is low. Moreover, the internal resistance does not change much during discharge. The consistency of voltage output during discharge is in great measure due to the low internal resistance thus provided. It is found that the action of the electrolyte on the zinc is more uniform than in conventional cells. Moreover, diffusion is more uniform, and cell reactions take place more freely, than inconventional cells. These characteristics increase the efficiency of the cell at high discharge rates. The cell is durable and withstands mechanical shocks well.

What we claim is:—

1. An improved primary cell having a high capacity, great structural strength and regular discharge characteristics, said cell comprising an anode combination comprising a plurality of cylindrical zinc anode members joined in electrical union in parallel and a plurality of rod-like cathodes disposed within the cylindrical zinc members, suspension means extending the height of the electrodes, a supporting spider for all the electrodes attached to the upper portion of the suspension means and a similar spider attached to the bottom portion thereof, means for supporting the cathodes and the anode combination from the spiders and insulating the anodes from the cathodes, the cathodes being connected in parallel, electrical connections for the anodes and cathodes, a cell jar and means for positioning in the jar, the suspension means and elements attached thereto.

2. An improved primary cell adapted to employ an alkaline electrolyte and having a high capacity, great structural strength and regular discharge characteristics, said cell comprising an anode assembly comprising a plurality of cylindrical zinc anode members and a like plurality of rod-like cathodes disposed within the cylindrical zinc members, suspension means extending the height of the electrodes, supporting spiders for the electrodes attached to the suspension means adjacent the top and bottom of the electrodes, means attaching the cathodes and the anode assembly to the top spider and to the bottom spider, the anodes and cathodes being insulated from each other, and electrical connections for the anodes and cathodes.

3. The apparatus of claim 1 wherein the number of cylindrical zinc members is seven and the zinc members are arranged in closest packed formation and seven cathodes are provided, one within each zinc member.

4. The matter of claim 1 wherein the cathodes comprise copper oxid as a depolarizer.

5. The matter of claim 1 wherein the cathodes comprise activated carbon.

6. The matter of claim 1 wherein the means for supporting the anodes and the cathodes from the spiders comprise insulating members engaging the anodes and the spiders and rods extending through the cathodes and attached to the spiders in electrical connection.

7. In a cell of the type described employing a liquid electrolyte and having electrode suspending means and supporting means for the cathodes attached to the suspending means, a spacer between the cathode and the suspending means, engaging and fitting the supporting means and provided with an opening exposing the suspending means, so as to prevent capillary leakage of electrolyte upward between the spacer and the suspending means.

8. In a cell of the type described employing a liquid electrolyte and having electrode suspending means including supporting means for the cathodes comprising a rod extending through the cathodes and attached to the suspending means, a spacer between the cathode and the suspending means fitting the rod and provided with a perforation therethrough exposing the rod, so as to prevent capillary leakage of electrolyte upward between the spacer and the rod.

9. A primary cell capable of delivering current at high amperage, comprising a plurality of cylindrical zinc anode members in unitary assemblage and in electrical union, a like plurality of rod-like cathode members disposed within the anode members, current conducting suspending means rigidly supporting the cathodes at each end of the cathodes and in electrical connection with the cathodes, an electrical cell connection to said suspending means, and means for insulatively supporting the said anode assembly upon the suspending means at each end of the anodes to hold the anodes in spaced relation to the cathode assembly and the suspending means.

10. A primary cell comprising a container, a cover therefor, seven cylindrical anode members, six of the anode members being arranged in a circle and the seventh being centrally located in the circle, and seven cylindrical cathode members, supporting means for the members comprising means for retaining the cathode members and insulatively supporting the anode members in spaced relation and a bolt passing through the central cathode member and the supporting means and suspending the anodes, cathodes and spacing means from the cover.

11. A primary cell adapted to deliver current at a high rate of discharge, comprising a plurality of hollow zinc anode members joined together as a unit and being electrically connected in parallel and a like plurality of cathode members within to the anode members and electrically connected in parallel, and current-conducting supporting means supporting and retaining the cathodes at both ends of the cathodes and in electrical union therewith, an electrical connection to the supporting means, an electrical connection to the anode members, and means for supporting the anode members in spaced relation adjacent the cathodes and insulating the anode members from the cathodes.

12. A primary cell adapted to deliver current at a high rate of discharge, comprising a plurality of hollow anode members in unitary assemblage and electrically connected in parallel, a plurality of cathode members within said anode members, current-carrying assembly means supporting and electrically connecting at their respective opposite ends the said cathode members so that the cathode members are connected in parallel, means for insulatively supporting the said anode members at their respective opposite ends in spaced relation to the said cathode assembly, an electrical cell connection to the anodes, a cell jar and means for suspending the said assembly means in the cell jar.

13. In a cell adapted to deliver current at a high rate of discharge, the combination of a plurality of cathode members and a like plurality of zinc anode members, an upper and lower spider electrically connecting said cathode members and insulatively supporting said zinc anode members at each end thereof, a bolt passing through the said spiders and one of the said cathode members, said bolt holding the whole assembly in clamped spaced relation.

14. A primary cell adapted to deliver current at a high rate of discharge, comprising a hanger, upper suspension means supported by said hanger, a plurality of cylindrical depolarizer elements suspended from said hanger with the axes of the elements spaced laterally in parallel relation, insulating means engaging the hanger, lower supporting means for the depolarizer elements secured comprising a supporting spider supported by said hanger, the depolarizer elements being supported at each end, a plurality of lower insulating members carried on the spider, a plurality of cylindrical anodes side by side in parallel spaced relation and each surrounding one of the depolarizer elements, the anodes being in parallel electrical contact with each other, said cylindrical anodes being supported by the aforesaid insulating means, and a lead wire attached to the anodes.

15. In a primary cell, a jar adapted to contain electrolyte and a cover for the jar, a unitary assemblage of cathode and anode members comprising a plurality of anode members side by side in parallel spaced relation and a plurality of cathode members in parallel spaced relation, each anode member being opposed to a corresponding cathode member, an upper and a lower spider electrically connecting said cathode members together and keeping them in parallel spaced relation, said spiders also insulatively supporting the anode members in parallel spaced relation, a lead wire attached to the anode members and a bolt for attaching the said unitary assembly from the cover of the cell and suspending it therefrom.

MARTIN L. MARTUS.
      EDMUND H. BECKER.
      JAMES G. ROSS.